(12) United States Patent
Monaco et al.

(10) Patent No.: US 7,986,632 B2
(45) Date of Patent: Jul. 26, 2011

(54) PROACTIVE NETWORK ANALYSIS SYSTEM

(75) Inventors: Jeffrey P. Monaco, Irwin, PA (US);
Michele R McGough, Pittsburgh, PA (US)

(73) Assignee: Solutions4Networks, Pittsburgh, PA (US)

( * ) Notice: Subject to any disclaimer, the term of this patent is extended or adjusted under 35 U.S.C. 154(b) by 2 days.

(21) Appl. No.: 12/534,431

(22) Filed: Aug. 3, 2009

(65) Prior Publication Data

US 2010/0020715 A1    Jan. 28, 2010

Related U.S. Application Data

(63) Continuation of application No. 11/193,004, filed on Jul. 29, 2005, now abandoned.

(60) Provisional application No. 60/592,285, filed on Jul. 29, 2004.

(51) Int. Cl.
*G01R 31/08* (2006.01)
(52) U.S. Cl. .......................................... 370/248; 370/231
(58) Field of Classification Search .................. 370/231, 370/241, 247, 248
See application file for complete search history.

(56) References Cited

U.S. PATENT DOCUMENTS

| | | | |
|---|---|---|---|
| 5,954,829 A | 9/1999 | McLain, Jr. et al. | |
| 7,317,723 B1 | 1/2008 | Guru | |
| 7,607,093 B2 * | 10/2009 | Blomquist | 715/736 |
| 7,636,314 B1 * | 12/2009 | Reams, III | 370/237 |
| 2003/0145039 A1 | 7/2003 | Bonney et al. | |
| 2003/0187982 A1 | 10/2003 | Petit | |
| 2004/0166857 A1 | 8/2004 | Shim et al. | |
| 2004/0204949 A1 | 10/2004 | Shaji et al. | |
| 2005/0015626 A1 | 1/2005 | Chasin | |
| 2005/0049726 A1 | 3/2005 | Adamson et al. | |
| 2005/0114495 A1 | 5/2005 | Clemm et al. | |
| 2005/0138114 A1 | 6/2005 | Connor et al. | |
| 2005/0243729 A1 | 11/2005 | Jorgenson et al. | |
| 2007/0100585 A1 | 5/2007 | Dulberg et al. | |
| 2007/0143463 A1 | 6/2007 | Luo et al. | |
| 2007/0198707 A1 | 8/2007 | Boyd et al. | |
| 2008/0008202 A1 | 1/2008 | Terrell et al. | |
| 2008/0014917 A1 | 1/2008 | Rhoads et al. | |
| 2008/0317032 A1 | 12/2008 | Anschutz | |
| 2009/0052320 A1 | 2/2009 | Ling et al. | |

OTHER PUBLICATIONS

Sharpe et al., Ethereal User's Guide, Richard SharpeEd Warnicke, 2001.*

* cited by examiner

*Primary Examiner* — Kwang B Yao
*Assistant Examiner* — Tung Q Tran
(74) *Attorney, Agent, or Firm* — Blynn L. Shideler; Krisanne Shideler; BLK Law Group

(57) ABSTRACT

A proactive network analysis system is a single unit for diagnosing network problems, measuring network performance, and monitoring network status in a comprehensive manner. The system is a compilation of individual tools including a distributed network packet capture data stream collector; a traffic analyzer; a performance graphing unit; a syslog recorder analyzer and archiving unit; a system availability monitor; a device configuration archiving unit; and a throughput measurement tool. The system can further provide an access list generator, an access list analyzer, a router DNS name generator and a service level agreement measurement device.

6 Claims, 3 Drawing Sheets

PROACTIVE NETWORK ANALYSIS SYSTEM

RELATED APPLICATIONS

This application claims the benefit of provisional application Ser. No. 60/592,285 Entitled "Proactive Network Analysis System" filed Jul. 29, 2004.

BACKGROUND OF THE INVENTION

1. Field of the Invention

The present invention relates to network administration and optimization, more particularly the present invention relates to a network analyses tool for minimizing network downtime and maximizing network operation and efficiencies.

2. Background Information

A LAN, or "local area network", is a computer network generally spanning a relatively small area, such as in an office or a home and are capable of transmitting data at very fast rates. Most LANs are confined to a single building or group of buildings. However, one LAN can be connected to other LANs over distances via telephone lines and radio waves, forming a wide area network or WAN. Most LANs connect end user devices such as workstations and personal computers, known as nodes of a network. Each node (e.g. individual end user device) in a LAN has its own CPU with which it executes programs, but it also is able to access data and devices anywhere on the LAN. This means that many users can share devices, such as printers, as well as data. Users can also use the LAN to communicate with each other, by sending e-mail, or chat sessions or the like. Access to the network is of critical importance to the users.

There are many different types of LANS. LANS can be differentiated by topology, which is the geometric arrangement of devices on the network, such as a ring arrangement or in a straight line arrangement; protocols which are the rules and encoding specifications for sending data; and connection media such as twisted pair wire, coaxial cables, fiber optic or wireless. The wireless LANs are also referred to as WLANs with Wi-Fi being the dominant WLAN standard.

The integrity and performance of a computer network, a LAN or WLAN or other network, is critical. There are demands for essentially 100% "uptime" of a network for the users to provide services to customers, partners, vendors, and employees. The term "uptime" references the period in which access to a network, and the components thereof, are available. The term "downtime", also called a network outage, reference the time when a network is inaccessible to users. Although the elimination of all network outages is never a guarantee, managing the network infrastructure can assist in minimizing such outages and maximizing uptime.

Various networks are known to have numerous infrastructure inefficiencies, such as in large campus environments, data centers, and remote site location networks. A variety of tools have been created for analyzing and managing network infrastructures. For example, log files from hosts, application logs, intrusion detection systems (IDSs), and network devices are sources of information on network traffic patterns. However, logging mechanisms need to be enabled and properly configured. Log files can be destroyed or altered if a system becomes compromised, and uncertainty about the integrity of system log files rises when out-of-band logging is not performed. In summary, the existing analysis and management tools provide adequate review and analysis to specific areas addressed by the specific tool. However it is left to the network administrator to select the combination of specific tools needed and to combine the results of such tools to properly manage the network. There is a need in the industry to provide network administrators with a single analysis unit for providing comprehensive diagnoses of network problems, measurement of network performance, and monitoring network status.

SUMMARY OF THE INVENTION

The proactive network analysis system according to the present invention is a single system, or unit, for diagnosing network problems, measuring network performance, managing and monitoring network status in a comprehensive and synergistic manner. The system according to the present invention is a compilation of individual tools assembled in an easy-to-use, cost effective system, or tool kit, for analyzing, isolating, and solving complex network issues wherein the independent tools provide a synergistic effect for the network administrator. The system according to the present invention includes a distributed network packet capture data stream collector; a traffic analyzer; a performance graphing unit; a syslog recorder analyzer and archiving unit; a system availability monitor; a device configuration archiving unit; and a throughput measurement tool. The system can further provide an access list generator, an access list analyzer, a router DNS name generator and a service level agreement measurement device.

These and other advantages of the present invention will be clarified in the description of the preferred embodiments taken together with the attached drawings in which like reference numerals represent like elements throughout.

DETAILED DESCRIPTION OF THE PREFERRED EMBODIMENT

Figure 1:
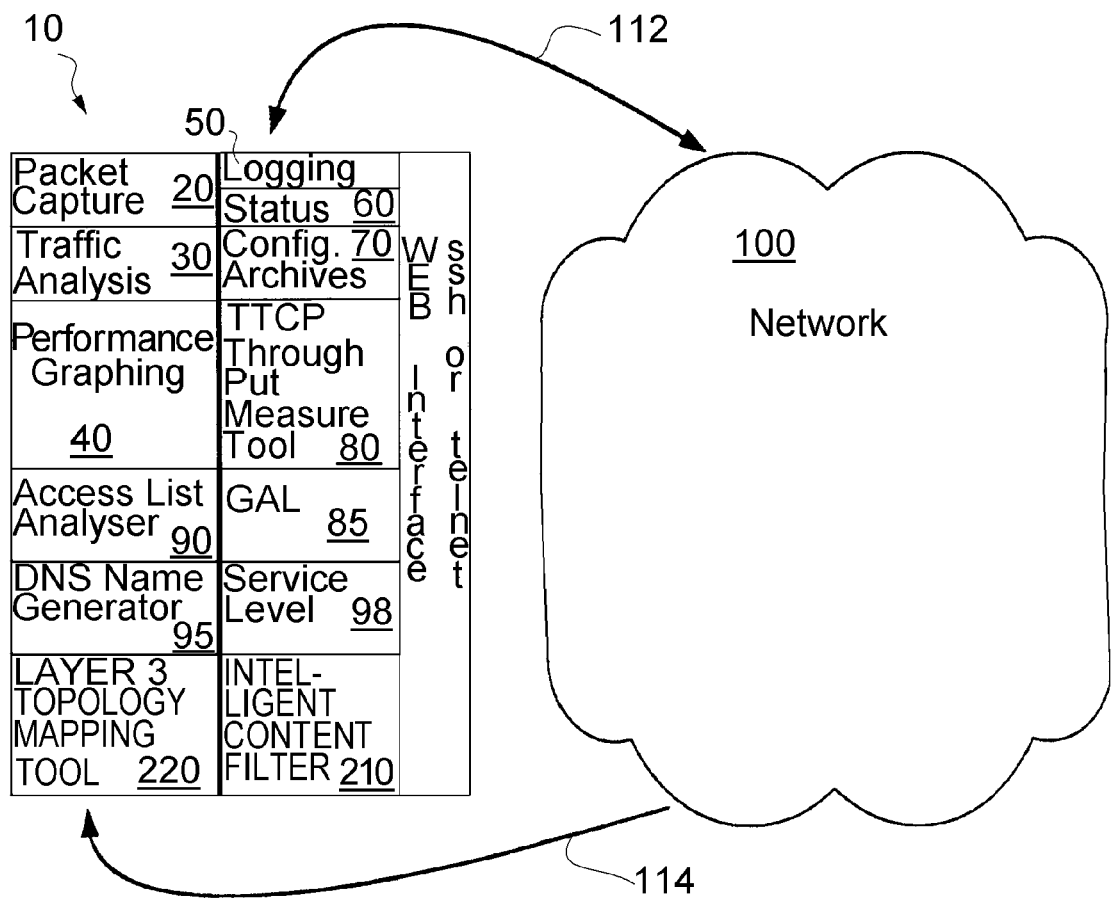
FIG. 1 is a schematic view of a proactive network analysis system according to the present invention.

Many tools and techniques are available to audit and monitor a network environment. The proactive network analysis system 10 according to the present invention is an integrated compilation of mainly existing network tools providing a comprehensive integrated system for diagnosing network problems, measuring network performance, and monitoring network status. The system 10 is, in effect, an easy-to-use, cost effective tool kit for analyzing, isolating, and solving complex network issues. The system 10 includes a distributed network packet capture data stream collector 20; a traffic analyzer 30; a performance graphing unit 40; a "syslog" recorder analyzer and archiving unit 50; a system availability monitor 60; a device configuration archiving unit 70; and a throughput measurement tool 80 seamlessly combined into a single system 10.

In overview, the distributed network packet capture data stream collector 20 provides a highly scalable solution to meet network growth at an affordable cost. The collector 20 delivers access to data and information, as needed, to the network administrator for root-cause analysis.

The traffic analyzer 30 provides decoding capabilities for Layer 2 and Layer 3 data transport protocols and delivers extensive collection capabilities locally and remotely across major network topologies. The OSI, or Open System Interconnection, model defines a networking framework for implementing protocols in seven layers. Control is passed from one layer to the next, starting at the application layer in one station, and proceeding to the bottom layer, over the channel to the next station and back up the hierarchy. The seven layers include the application layer (7), the presentation layer (6), the session layer (5), the transport layer (4), the network layer (3), the data link layer (2) and the physical layer (1). The network layer (3) provides switching and routing-technologies, creating logical paths, known as virtual circuits, for transmitting data from node to node. Routing and forwarding are functions of this layer, as well as addressing, inter-networking, error handling, congestion control and packet sequencing. At the data link layer (2), data packets are encoded and decoded into bits. It furnishes transmission protocol knowledge and management and handles errors in the physical layer, flow control and frame synchronization. The data link layer is divided into two sub-layers: The media access control (MAC) layer and the Logical Link Control (LLC) layer. The MAC sub-layer controls how a computer on the network gains access to the data and permission to transmit it. The LLC layer controls frame synchronization, flow control and error checking.

The performance graphing unit 40 provides meaningful representation of analyzer traffic and statistics. The performance Graphing unit 40 illustrates statistics and real time data captures within a browser user interface and further provides printable hardcopy options. The "syslog" unit 50 saves and analyzes "syslog" messages. "Syslog" is the de facto standard for logging network events. The unit 50 summarizes thousands of lines of Syslog into a meaningful, easy-to-read report.

The system availability monitor 60 checks and logs the status of devices and services. The monitor 60 is topology aware, whereby individual device outages on the network do not generate false 'all network' outages.

The device configuration archiving unit 70 gathers device (router, switch, etc.) configurations. The configurations are archived by the unit 70, and a 'difference' report is generated highlighting changes to the network device configurations.

The throughput measurement tool 80 is a bandwidth analyzer that determines the transfer rate between two points. The network administrators can utilize the tool 80 to validate WAN connection bandwidth and QoS settings provided by Services Providers.

The Distributed Network Packet Capture Data Stream Collector 20

Regarding the data stream collector 20, a packet capture is a recording of network traffic, also called a packet capture. Packet captures are useful to the network administrator when trying to decipher problems with network capable software. For example, in addressing certain network problems problem it may be helpful to have a packet capture of the errant traffic and a packet capture of an analogous operation. In order to obtain a packet capture of network traffic it is necessary to run special software on a machine that is capable of receiving the traffic of interest. There are many existing tools that can do this. For example, Tcpdump is a command line utility for UNIX (there's also a windump for Windows). Tcpdump is often distributed with Linux distributions. Additionally, ethereal is a CU' based application that will capture packets as well as display the individual fields within packets. Ethereal is also distributed with Linux distributions. It can also be obtained at http://www.ethcreal.com. It runs on UNIX as well as even Windows with an additional packet capture driver. Further, netmon is a Windows application that will capture packets as well as display some information within packets (not as much as Ethereal). NetMon is usually bundled with other networking oriented packages such as SMS.

The Ethereal packet capture program also has a very nice user interface for examining the contents of packets and will understand NetMon and tcpdump packet captures. The Ethereal packet capture program is also referred to as a protocol analyzer and it will illustrate three views of a packet. It shows a summary line, briefly describing what the packet is, A protocol tree is shown, allowing you to drill down to exact protocol or field that you interested in. Finally, a hex dump shows you exactly what the packet looks like when it goes over the wire.

The present system 10 utilizes the Tethereal packet capture program for the data stream collector 20. Other data stream collector systems could also be utilized, such as the network packet capture facility in Java, Libpcap, and tcpdump.

Traffic Analyzer 30

A conventional traffic analyzer is used to assess the actual end-to-end conditions in real-time. It samples specified end-to-end paths from the same point of view as an application. The sampling can be either network layer (IP) or OS layer (TCP) or even application layer (i.e. HTTP, SMTh5 FTP.). The traffic analysis can generate detailed, hop-by-hop views of end-to-end paths that offer real-time measures of the capacities of the links, the traffic in the path, and problem analysis, identification and isolation. The traffic analysis offers end-to-end views; real-time, actual performance; location of critical points of performance degradation (i.e. where the network is under- or over-provisioned); easy adaptation to changes in network configuration. Traffic analysis alone does not provide a historical perspective. The traffic analysis can provide rapid isolation of performance bottlenecks and offers powerful diagnostic capabilities.

Network traffic analysis can identify for the network administrator what has happened or is happening by revealing unauthorized activity from utilization, traffic patterns, and network address space. Network sniffers, sensors, and packet re-assemblers can capture and reconstruct network sessions.

There are numerous traffic analyzers available. Windows 95/98/NT traffic monitors include ANALYZER that uses WINDUMP; LANMON; LANsleuth; LANdecoder32, Lanwatch; NetAnt; NetXRay; Netspy; and Netmon. The Cisco Network Analysis Module (14AM) is an integrated traffic monitoring solution for the high-performance Cisco Catalyst® 6500 Series, Cisco 7600 Series routers, and Cisco 2600/3660/3700 Series multi-service access routers. Iris is described as a network traffic analyzer designed to proactively monitor a network. The traffic analyzer 30 of the system 10 is preferably ntop, although cflowd and traffic-vis are alternatives.

Performance Graphing Unit 40

The network management tools described herein will collect a tremendous amount of data during audit and monitoring exercises. Data volumes can range from megabytes to terabytes depending on the environment (number of users, applications, business, and so on). The system 10 needs an effective way to display the data in a meaningful way to allow for the network administrator to analyze this data. Graphic visualization of the data with the graphing unit 40 is critical for meaningful analysis by the network administrator. The results can simply be graphed, but the addition of automated analysis and notification can considerably increase the benefit to the network administrator Predictive capabilities may be delivered via trend analysis techniques.

"EtherApe is a graphical network monitor for Unix modeled after etherman. Featuring link layer, ip and TCP modes, it displays network activity graphically. Hosts and links change in size with traffic. Color coded protocols display. It supports Ethernet, FDDI, Token Ring, ISDN, PPP and SLIP devices. It can filter traffic to be shown, and can read traffic from a file as well as live from the network." (For Linux only). Existing graphing units include VIZNET which is a Java application to visualize network bandwidth performance over time; the Multi Router Traffic Grapher (MRTG) tool (from http://www.mrtE.org) queries routers and then graphs the results in a simple and yet very effective fashion; and the ntop program shows network statistics such as source and destination distribution via an embedded web server. The system 10 preferably utilizes Cacti and its rrdtools backend database, although mrtg, mrtgfe, and Ops control panel are alternatives.

Syslog Recorder Analyzer and Archiving Unit 50

Log consolidators collect and summarize log events from hosts, network devices and multi-vendor security applications, bringing them into a centralized system. Audit and monitoring heighten network administrators' awareness of network usage practices. The feedback from these techniques can be used to enhance current intrusion detection system signatures or firewall rule sets. It also can provide a basis for security awareness tips and focused user training, which will enhance overall protection. Other benefits include reduced time and resources spent responding to an incident, reduced network misuse, and stronger policy enforcement. Audit and monitoring is most often used to detect and analyze anomalous behavior.

As noted above, syslog is a de-facto standard for logging system events. The program syslog analyzer is Windows and UNIX System Event Log Analysis and Reporting program. The program provides an easy-to-use, Web-based analysis and reporting solutions that can analyze event logs generated by Windows and UNIX networks and provide valuable information about the health and security of such networks. The system 10 utilizes a syslog analyzer program. The specific analyzer program used is log analysis, and syslogd and logrotate features of Linux may be acceptable.

System Availability Monitor 60

The system availability monitor continuously monitors the components of the network testing specific component availability. In the event of a failure or unavailability of a component, the unavailability of the component is recorded and the network administrator advised, as needed. Further the monitor 60 may automatically redirect users to the backup component to minimize network downtime. The current network status is displayed to the network administrator in near-real time. When problems are detected, the network administrator can be notified by e-mail, pager, or text messaging, or the like. The continuous monitoring, with alerts, provides a proactive feedback mechanism for the network administrator. The monitor 60, and the history thereof, can be used to predict problems before they occur. Further the monitor 60 provides historical and trending information for automated analysis or for fixture network planning. The specific monitor program utilized is Autostatus, and WhatupGold, and sysmon are acceptable alternatives.

Device Configuration Archiving Unit 70

The documentation of network resources and the network configurations is usually the first step before re-designing a network. In many instances, an initial network audit can uncover network mis-configurations, the resolution of which can eliminate or postpone the need for a network upgrade.

The device configuration archiving unit 70 will document and automate network device configuration management allowing the network administrator to gather a baseline of current configurations, audit changes in configurations, rollback to previous known good configurations in the event of a disaster, and perform a risk assessment or impact analysis of planned changes and implement changes more efficiently. The configuration archiving unit 70 provides visibility and reporting into network device details including hardware, software and configuration information. With real-time change detection and correlation, the unit 70 provides detailed inventory, compliance and change reporting, as well as fast troubleshooting. The unit 70 utilized existing program known as pancho, and yale-tftpd, tftpd built-in with Linux and jtftp may also be considered.

Throughput Measurement Tool 80

Capacity is the maximum throughput that a network path can provide to a given application. Bandwidth, on the other hand, is the portion of a path's capacity that is not utilized in competing cross traffic. Internet resources are often used inefficiently due to the inability to cooperatively share and access existing bandwidth. High bandwidth applications such as grid interfaces, high-speed file transfers, and streaming media are particularly hindered by the inability to accurately ascertain bandwidth parameters in real-time. Bandwidth estimation tools are especially important to high throughput data-intensive distributed applications. There are a number of bandwidth estimation tools.

The program Iperf is a TCP and UDP bandwidth testing tool, similar in function to the traditional ttcp tool.

The program fling is a point-to-point bandwidth measurement tool, based on ping. Fling determines the real (raw, as opposed to available or average) throughput on a link by measuring ICMP echo requests roundtrip times for different packet sizes for each end of the link.

The program bprobe/cprobe is a tool that estimates the maximum possible bandwidth along a given path. cprobe estimates the current congestion along a path. Currently these tools rely on two features of the IRIX operating system for SGI hardware.

The program Netperf is a benchmark that can be used to measure the performance of many different types of networking. It provides tests for both unidirectional throughput, and end-to-end latency. The environments that can be measured by netperf include TCP and UDP via BSD Sockets; DLPI; Unix Domain Sockets; Fore ATM API; and HP HiPPI Link Level Access.

The program nettimer is useful for measuring end-to-end network performance. It can simulate or passively collect network traffic, and can also actively probe the network using a packet-pair 'tailgating' technique. There is no requirement for any special information from the network and no limitation to a particular transport protocol. Currently implemented metrics include bottleneck bandwidth and link bandwidth. Collected data is output using 'ns' database format, The program pathchar estimates performance characteristics of each node along a path from a source to destination. Pathchar uses knowledge about earlier hops and the round trip time distribution to this hop to assess incremental bandwidth, latency, loss, and queue characteristics across this link. The program pchar, similar to pathchar, attempts to characterize the bandwidth, latency, and loss of links along an end-to-end path through the Internet. pchar works on both IPv4 and IPv6 networks.

The program TReno is a TCP internet throughput measurement too based on a user-level implementation of a TCP-like protocol. This allows it to measure throughput independently of the TCP implementation of end hosts and to serve as a useful platform for prototyping TCP changes. TReno is associated with the IPPM formal metrics effort (see http://www.psc.edu/~mathis/ippm/).

Uvault Host Analyzer is a bandwidth monitor tool for managing traffic of applications hosted by the Flash Communication Server. Uvault can analyze bandwidth usage and traffic patterns of users accessing applications on Macromedia's Flash Communication Server.

The program RTTometer is a measurement tool to estimate path minimum RTT along with a measure of path condition. Similar to traditional ping, it sends a set of probes and reports the RTT experienced by each probe. Moreover, RTTometer makes use of all information gathered about the path revealed in all probes to estimate path condition. It associates a confidence measure with the captured minimum RTT.

The program mtr combines the functionality of the 'traceroute' and 'ping' programs in a single network diagnostic tool. As mtr starts, it investigates the network connection between the host mtr runs on and a user-specified destination host. After it determines the address of each network hop between the machines, it sends a sequence ICMP ECHO requests to each one to determine the quality of the link to each machine. As it does this, it prints running statistics about each machine.

Initial Gap Increasing, or IGI, is an available bandwidth measurement tool using active probing, which can be used to measure the available bandwidth between two end points on Internet.

The system 10 uses ttcp and/or mtr as the throughput measurement tool, although Iperf is an acceptable alternative.

Access List Generating Tool 85

This is an easy-to-use tool 85, also called GAL for Generating Access List, providing a logical way for a network manager to define and maintain access and traffic policies for their routers and firewalls, and is a tool oriented toward CiSco™ routers and Cisco PIX firewall, It then generates the correct Access List entries to implement the policies and provides reports that can be presented to the Security Audit staff for their review and approval of those policies.

Access List Analyzing Tool 90

This is a tool 90 that is also oriented toward Cisco™ routers and Cisco PIX firewall. In a router, Access Lists are a way to control or identify traffic. They have a tendency to become very large, very quickly. Frequently, and over time, they are maintained by different people. In this environment, it is easy for logic errors to be made, such that the desired Access List does not performed as required, but the support staff does not know this. The Access List Analyzer tool 90 takes, as input, a router or PIX configuration file. The output of the tool 90 is a report that indicates which Access List entries are inconsistent, and the commands necessary to remove the inconsistent entries, if desired, providing an efficient tool for network managers.

DNS Name Generating Tool 95

This is a tool 95 that is also oriented toward Cisco™ routers. DNS, the Domain Name System, is used to assign human-meaningful names to IP addresses. Thus, a hard-to-remember address such as 10.34.89.7 might be named webserver7. In the case of a router, there may be may be many dozens of IP addresses associated with the device. Good networking practice dictates that each address should have a name assigned, but the administrative burden of putting together the name+address is high. Many times, the DNS name assignment is not done, The DNS name generator tool 95 is a tool that takes, as input, a router configuration file. The output of the tool is a meaningful name for each of the IP addresses in the configuration file.

Service Level Agreement Measurement Device 98

The service level agreement tool 98 is a device for assuring that the level of service provided by a network provider is within the promises of the service level agreement. Through making the service level agreement tool 98 as a separate tool in the system 10, the system administrator will have an easy manner of reviewing this material. There are many providers that promise a certain level of service and assert a certain level of past performance, but there has never been an efficient tracking tool for administrators to verity these claims. The service level agreement tool 98 addresses this need and may be particularly helpful in negotiating with fixture network providers for continuation of existing service or new services.

The system 10 is an easy-to-use, cost effective, integrated tool kit for analyzing, isolating, and solving complex network issues. As discussed above there are numerous tools for network administration. The system 10 according to the present invention provides a unique combination of existing tools in a single integrated unit which includes a distributed network packet capture data stream collector 20; a traffic analyzer 30; a performance graphing unit 40; a syslog recorder analyzer and archiving unit 50; a system availability monitor 60; a device configuration archiving unit 70; a throughput measurement tool 80 seamlessly combined into a single system 10; an access list generator 85; an access list analyzer 90; a router DNS name generator 95; and a service level agreement measurement device 98. The distributed network packet capture data stream collector 20 and the traffic analyzer 30 may be considered diagnostic tools, the access list generator 85, access list analyzer 90, router DNS name generator 95 and the service level agreement measurement device 98 may be grouped as proprietary additions to an integrated network tool, while the remainders are considered to be existing network management devices.

Figure 2:
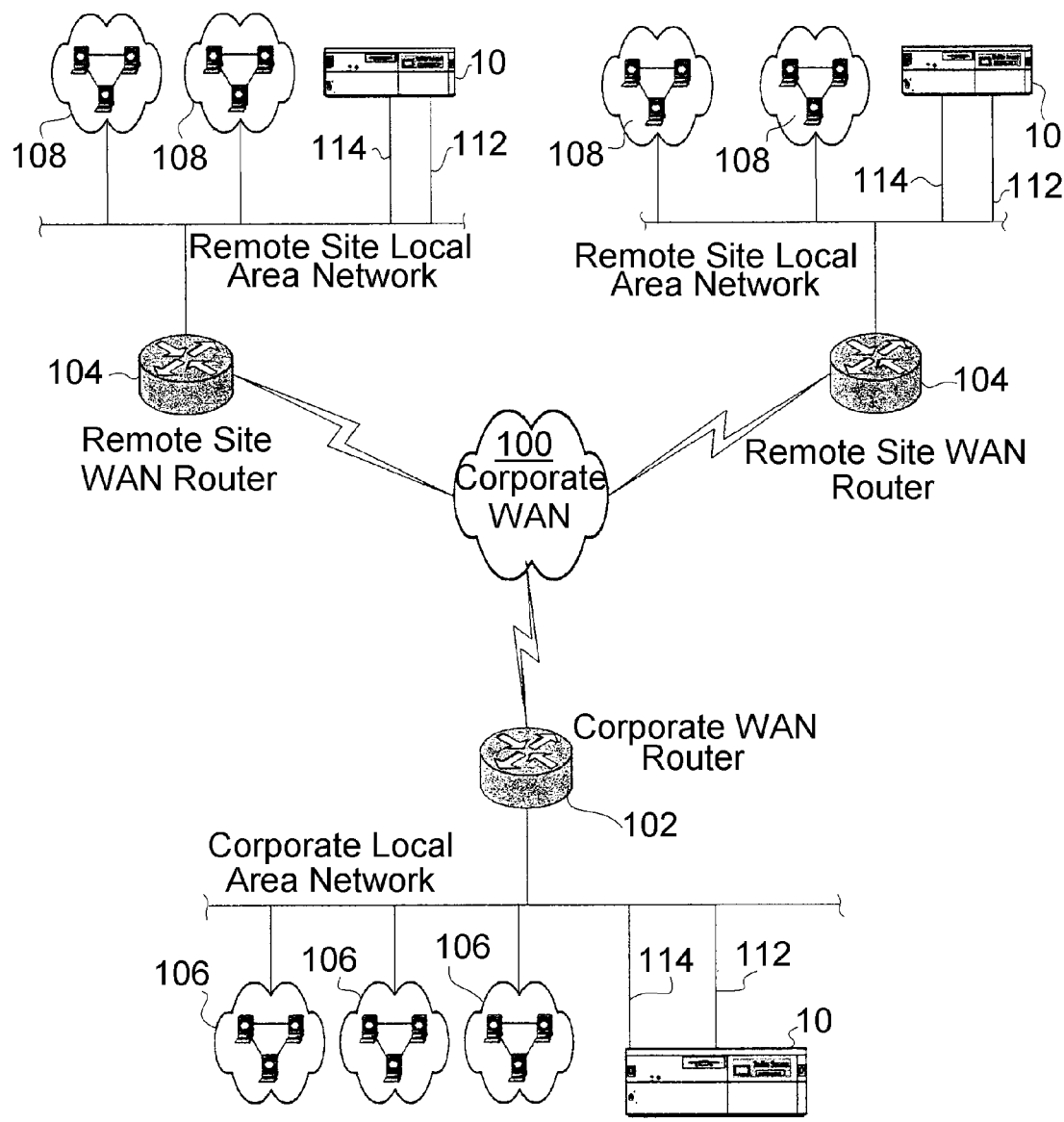
FIG. 2 is a schematic view of a network implantation of the proactive network analysis system of FIG. 1 according to the present invention.

The system 10 can be implemented in a network, such as a corporate WAN 100 shown in FIG. 2. The Wan 100 may have a primary or corporate WAN router 102 and at least one remote site WAN router 104, the corporate LAN will typically have the corporate (i.e. local) DSN, Web, Mail, File and Database servers 106 and the remote LAN will also have local DSN, Web, Mail, File and Database servers 108. The specific network configurations are varied and well known to those of ordinary skill in the art. The system 10 will include a general or management interface 112 with the LAN as well as a packet capture interface 114, as schematically illustrated. At the remote sites the system 10 provides web based packet capture, real time traffic analysis, syslog processing, network device configuration back up/retrieval, and network and system device status. The system 10 can further provide graphing of historical network and system utilization and performance. At the corporate or central site, the system 10 will provide web based packet capture, real time traffic analysis, network device configuration back up/retrieval, network and system device status, and graphing of historical network and system utilization and performance.

The system 10 includes more than the collection of existing components in an integrated interface, the system 10 can further provide the access list generator 85, an access list analyzer 90, a router DNS name generator 95 and a service level agreement measurement device 98 as discussed above that are not found in other network management devices.

Figure 3:
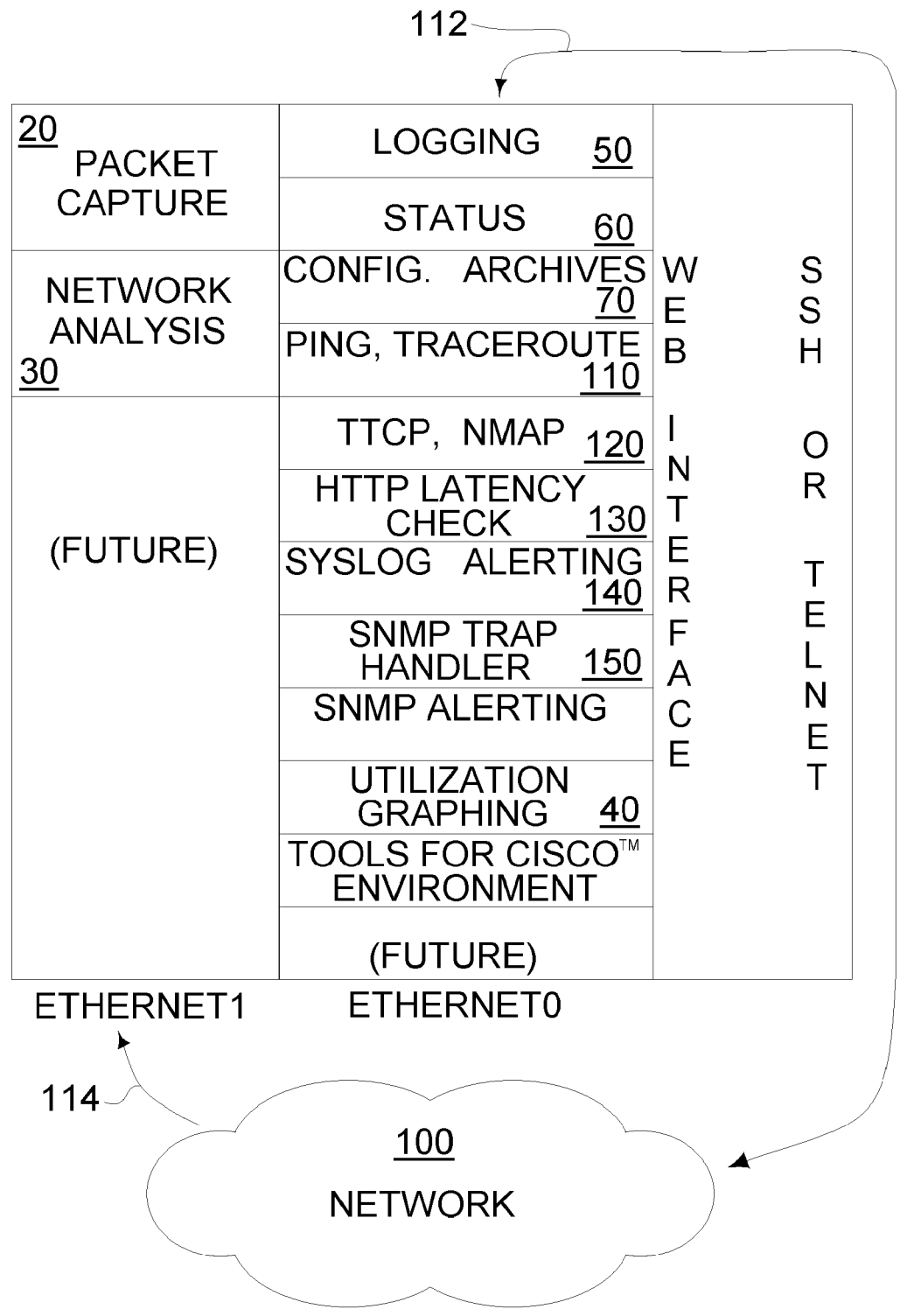
FIG. 3 is a schematic view of a proactive network analysis system according to a modified aspect of the present.

The system 10 can incorporate other features in addition to those described above, such as currently found in the Netterrogator™ product sold by the assignee Solutions4Networks, and generally illustrated in FIG. 3. In the system 10 shown in FIG. 3, access to the system 10 can be via a web browser. This does not preclude the use of telnet or SSH, but they are no longer required to use any of the features of the system 10. The system 10 supports multiple userids. Each id can be given access to select functions of the system 10. The system 10 supports a patch mechanism, which by itself is not new to network management products. What is new regarding the patch mechanism in the system 10, is that the system 10 uses the patch mechanism to allow users to backup their settings, or migrate their setting to other network management systems 10. The user can prepare a 'migration' patch (with just one click) that includes all their definition files. They can then apply the patch to a different system 10 and instantly make it look like the original, which is very convenient for management of several systems 10.

The system 10 of FIG. 3 includes several new diagnostic tools for the network manager. The first is an Enhanced Ping 110 that builds on the basic 'ping' tool that is supplied with many IP stacks. The system 10 issues multiple pings of different sizes. Also, the system 10 issues the pings with the 'Don't Fragment' flag set. The combination of the two approaches identifies problems related to VPN tunnel connections. In addition or in conjunction with the enhanced ping 110 is an enhanced traceroute tool (also shown at 110) to combine the functionality of the 'traceroute' and 'ping' programs in a single network diagnostic tool. As the enhanced traceroute program starts, it investigates the network connection between the host that it runs on and a user-specified destination host. After it determines the address of each network hop between the machines, it sends a sequence ICMP ECHO requests to each one to determine the quality of the link to each machine. As it does this, it prints running statistics about each machine. The enhanced traceroute tool may be formed from an open source tool known as "Matt's Traceroute" or mtr discussed above, although other installations are possible. The "front end" of such programs would be integrated into the system 10 for ease of use.

The system 10 of FIG. 3 further includes a network mapper 120 as a diagnostic tool, such as NMAP (an open source utility) with a modified GUI front end to integrate into the system 10. The mapper 120 is for network exploration or security auditing. It was designed to rapidly scan large networks, although it works fine against single hosts. Nmap uses raw IP packets to determine what hosts are available on the network, what services (application name and version) those hosts are offering, what operating systems (and OS versions) they are running, what type of packet filters/firewalls are in use, and other network characteristics.

The system 10 of FIG. 3 includes a HTTP Latency Check tool 130 as a diagnostic tool that allows users to specify a URL, and get an exact measurement of the time it takes for the web page to load. The intent is to use this in situations where the system 10 is installed at a remote site, and the site personnel are complaining about poor web performance. This is a way to quantify the actual response time for the specified web pages.

The system 10 further includes some additional management tools, for example, the system 10 can now issue alert messages based on the text of syslog messages with the syslog alert tool 140 and will accept SNMP traps with a SNMP processing tool 150. The alerts can be sent to multiple users, either containing the original message text, or user-specified text. The SNMP processing tool 150 allows the system 10 to accept and log SNMP traps. Using the aforementioned SYSLOG Alert tool 140, the traps can then generate alerts.

A new proposed functional area of the system 10 not described above is the inclusion of an Intelligent Content Filter (ICF) 210. This tool 210 is a web (http) proxy server. The intent of tool 210 is to filter and disallow bad, i.e. pornographic, websites. Instead of simply generating lists of approved or disapproved sites, the ICF tool 210 uses the approach whereby 'bad' webpages are identified by their content instead of subscriptions lists. The ICF tool 210 uses a 'bayesian' analysis technique that determines 'goodness' or 'badness' based upon the frequency of good and bad content. It effectively filters out bad pages with a high degree of accuracy without the need of long 'white' or 'black' lists.

The system 10 is further proposed to include a management tool that is a Layer 3 (the IP layer) Topology mapping tool 220. This tool 220 will discover, or map out, the layer 3 topology of a given network. While there are other tools that do this, traditional approaches have all tried to draw a 'map' or diagram of the network. In practice, this is ineffective on large, corporate networks. The proposed approach of the Layer 3 mapping tool 220 for the system 10 is to display the data in tabular form, organized on a 'WAN Island' approach. Most networks are made up of many remote site high-speed LANs interconnected by a slower-speed WAN. The various sites will be determined based on the connection speed the site has to the rest of the network. For example, a site may consist of several routers and Ethernets (high-speed LANs), and a couple of T1 connections.

The system 10 is further proposed to include a remote access server identification tool to identify RAS servers (Remote Access Servers) on a network. The tool intends to use the following process:
1. Check each know Layer 3 switch (i.e. the Router).
2. On the router, get the ARP cache.
3. Find any MAC address that has multiple IP addresses associated with it.
4. Ignore known MAC addresses or vendor IDs. For example, you may want to ignore VMware servers.
5. Ping the IP addresses, and check the TTL on the resultant response. The primary server will have an TTL that is greater than the remotely attached devices. Based on the differing values of the TTL field, you can identify candidates as highly probably being a RAS server.

The system 10 will preferably be able to issue time of day command executions. Based on time-of-day and day-of-week, the system 10 will be able to issue application and Operating System commands to various systems. The system 10 will be able to determine the health of a system on more than just a ping response of a TCP port being available. It will be able to check for actual application availability. For example, it will pull back an actual web page to determine a web server and related application is functional. The system 10 will preferably allow for easy incorporation of future enhancements of tools, as shown in FIG. 3.

It will be apparent to those of ordinary skill in the art that various modifications may be made to the present invention without departing from the spirit and scope thereof. The scope of the present invention is defined by the appended claims and equivalents thereto.

What is claimed is:

1. A proactive network analysis system providing an integrated compilation of network tools for diagnosing network problems, measuring network performance, and monitoring network status, the system comprising:
   a distributed network packet capture data stream collector providing selective recordings of network traffic;
   a traffic analyzer providing selected samples of specified end-to-end paths, wherein the sampling is at one of the network layer, the IP layer, OS layer, or application layer;
   a syslog recorder analyzer and archiving unit to collect and summarize log events from the network; and
   a remote access server identification tool to identify Remote Access Servers on the network, wherein the tool uses the following process:
   a. Check each known Layer 3 switch,
   b. On the router, get an ARP cache,
   c. Find any MAC address that has multiple IP addresses associated with it,
   d. Ignore known MAC addresses or vendor IDs,
   e. Ping the IP addresses, and check the time-to-live value, known as TTL, on the resultant response, wherein a primary server will have an TTL that is greater than remotely attached devices and based on the differing values of the TTL field, a RAS server is identified.

2. The integrated proactive network analysis system of claim 1 wherein the system supports a patch mechanism, wherein the patch mechanism allows users to backup their settings, migrate their setting to other similar network management systems and import their settings from other similar network management systems.

3. The integrated proactive network analysis system of claim 1 further including a service level agreement tool that tracks the level of service provided by a network provider and compares the result to the promises of the service level agreement.

4. The integrated proactive network analysis system of claim 1 further including a DNS name generator tool that takes, as input, a router configuration file and outputs a meaningful name for each of the IP addresses in the configuration file.

5. The integrated proactive network analysis system of claim 1 further including a Generating Access List tool that generates the correct Access List entries to implement the desired policies and provides reports that can be presented to the Security Audit staff for their review and approval of those policies.

6. The integrated proactive network analysis system of claim 1 further including a Bandwidth estimation tool.

* * * * *